(12) United States Patent
Salecker et al.

(10) Patent No.: US 8,769,501 B2
(45) Date of Patent: Jul. 1, 2014

(54) METHOD FOR ANALYZING CHANGES IN A SOFTWARE CODE AND SOFTWARE ANALYSIS SYSTEM

(75) Inventors: Jürgen Salecker, München (DE); Egon Wuchner, Biessenhofen (DE)

(73) Assignee: Siemens Aktiengesellschaft, Munich (DE)

(*) Notice: Subject to any disclaimer, the term of this patent is extended or adjusted under 35 U.S.C. 154(b) by 197 days.

(21) Appl. No.: 13/313,600

(22) Filed: Dec. 7, 2011

(65) Prior Publication Data

US 2013/0152046 A1 Jun. 13, 2013

(51) Int. Cl.
*G06F 9/45* (2006.01)

(52) U.S. Cl.
USPC ............ 717/126; 717/127; 717/128; 717/141

(58) Field of Classification Search
None
See application file for complete search history.

(56) References Cited

U.S. PATENT DOCUMENTS

| | | | | |
|---|---|---|---|---|
| 5,860,007 A * | 1/1999 | Soni et al. | | 717/121 |
| 6,199,198 B1 * | 3/2001 | Graham | | 717/105 |
| 8,010,946 B2 * | 8/2011 | Zaky et al. | | 717/120 |
| 8,285,662 B2 * | 10/2012 | Bitonti et al. | | 706/47 |
| 8,336,023 B2 * | 12/2012 | Kuzsma et al. | | 717/105 |
| 2003/0088857 A1 * | 5/2003 | Balva et al. | | 717/137 |
| 2005/0229154 A1 * | 10/2005 | Hiew et al. | | 717/110 |
| 2006/0136894 A1 * | 6/2006 | Stallo et al. | | 717/168 |
| 2006/0168565 A1 * | 7/2006 | Gamma et al. | | 717/122 |
| 2006/0212843 A1 * | 9/2006 | Zaky et al. | | 717/106 |
| 2007/0143735 A1 * | 6/2007 | Clemm et al. | | 717/100 |
| 2008/0104570 A1 * | 5/2008 | Chedgey et al. | | 717/105 |
| 2008/0148225 A1 * | 6/2008 | Sarkar et al. | | 717/107 |
| 2009/0125877 A1 * | 5/2009 | Kuzsma et al. | | 717/105 |
| 2009/0150859 A1 * | 6/2009 | Cummings et al. | | 717/104 |
| 2009/0150861 A1 * | 6/2009 | Cowan et al. | | 717/105 |
| 2009/0276757 A1 * | 11/2009 | Lindvall et al. | | 717/121 |
| 2010/0023928 A1 * | 1/2010 | Hentschel et al. | | 717/124 |
| 2010/0077380 A1 * | 3/2010 | Baker et al. | | 717/120 |
| 2010/0162225 A1 * | 6/2010 | Huang et al. | | 717/171 |
| 2010/0287528 A1 * | 11/2010 | Lochmann | | 717/104 |
| 2010/0293519 A1 * | 11/2010 | Groves et al. | | 717/101 |
| 2010/0313179 A1 * | 12/2010 | Groves et al. | | 717/101 |
| 2011/0138373 A1 * | 6/2011 | Lane et al. | | 717/157 |
| 2011/0161936 A1 * | 6/2011 | Huang et al. | | 717/130 |
| 2012/0060144 A1 * | 3/2012 | Novak et al. | | 717/105 |
| 2012/0159420 A1 * | 6/2012 | Yassin et al. | | 717/101 |
| 2012/0159434 A1 * | 6/2012 | Dang et al. | | 717/120 |

* cited by examiner

*Primary Examiner* — Isaac Tecklu
(74) *Attorney, Agent, or Firm* — King & Spalding L.L.P.

(57) ABSTRACT

A method for analyzing changes in a software code may have the steps of: inputting a plurality of different versions of a plurality of software artifacts to a change analysis device, deriving design constructs of the software code of the software artifacts by using an abstract syntax tree analysis, with the software code differences between the different versions of each of the software artifacts, classifying the derived design constructs of each of the software artifacts according to the compared software code differences, and outputting a visualization of the design constructs of each of the software artifacts, which visualization is structured according to the classification of the design constructs.

20 Claims, 3 Drawing Sheets

METHOD FOR ANALYZING CHANGES IN A SOFTWARE CODE AND SOFTWARE ANALYSIS SYSTEM

TECHNICAL FIELD

The present invention relates to methods for analyzing changes in a software code and software analysis systems.

BACKGROUND

The maintenance and/or development of software code of a software system usually requires the cooperative work of a multitude of people. These people are confronted with an amount of unstructured information related to the software system, which amount scales with the size and complexity of the software system.

Whenever the underlying software code is changed, for example due to the implementation of new features of the removal of bugs, the information about what has actually been changed in the software code is often not readily apparent from the current version of the software system. Project members that try to address new problems may have a hard time finding out information about the current state of the software code that may be relevant to the problems they are trying to address. It is usually very time-consuming and difficult to achieve a high level of abstraction out of the flood of unstructured pieces of information that relate to previously performed changes to the software system.

SUMMARY

It is thus an idea of the present invention to automatically gather information about what changes in a software code have been introduced over time, sort and group the pieces of information according and present it as in different levels of abstraction to a user.

In one aspect, the invention provides a method for analyzing changes in a software code, the method comprising inputting a plurality of different versions of a plurality of software artifacts to a change analysis device, deriving design constructs of the software code of the software artifacts by using an abstract syntax tree analysis, comparing the software code differences between the different versions of each of the software artifacts, classifying the derived design constructs of each of the software artifacts according to the compared software code differences, and outputting a visualization of the design constructs of each of the software artifacts, which visualization is structured according to the classification of the design constructs.

According to one embodiment, classifying the derived design constructs comprises marking the design constructs as added, removed or changed from one version to another.

According to another embodiment, the method further comprises comparing the software code differences between different versions of different software artifacts. In one embodiment, classifying the derived design constructs comprises marking the design constructs as moved or renamed from one version of a first software artifact to a version of a second software artifact. In another embodiment comparing the software code differences between different versions of different software artifacts comprises applying a code duplicate or similarity finding technique.

In another aspect, the invention provides a method for analyzing changes in a software code, the method comprising inputting a plurality of software artifacts to a change analysis device, wherein the plurality of software artifacts are structured in a software component hierarchy of software components, each software component having a plurality of different versions comprising respective subgroups of different versions of the plurality of software artifacts, deriving architectural components of the software component hierarchy, comparing the differences between the compositions of different versions of the software components with respect to the different versions of each of the subgroups of the software artifacts, classifying the derived architectural components according to the compared software component compositions, and outputting a visualization of the different software component compositions, which visualization is structured according to the classification of the architectural components.

According to one embodiment, classifying the derived architectural components comprises marking the software components as added, removed or changed from one version of the software component composition to another.

According to another embodiment, the method further comprises deriving design constructs of the software code of the software artifacts by using an abstract syntax tree analysis, comparing the software code differences between the versions of the respective software artifacts making up each of the derived design constructs, performing a dependency analysis to classify the derived architectural components according to the interdependencies between different versions of derived design constructs, and outputting a visualization of the different architectural components, which visualization is structured according to the interdependencies between different versions of derived design constructs. In one embodiment, performing the dependency analysis comprises using an architectural analysis tool.

In yet another aspect, the invention provides a software analysis system, comprising a change analysis tool which is configured to analyze changes in a software code by reading a plurality of different versions of a plurality of software artifacts into a system memory, deriving design constructs of the software code of the software artifacts by using an abstract syntax tree analysis, comparing the software code differences between the different versions of each of the software artifacts, classifying the derived design constructs of each of the software artifacts according to the compared software code differences, and outputting a visualization of the design constructs of each of the software artifacts, which visualization is structured according to the classification of the design constructs.

In yet another aspect, the invention provides a software analysis system, comprising a change analysis tool which is configured to analyze changes in a software code by reading a plurality of software artifacts into a system memory, wherein the plurality of software artifacts are structured in a software component hierarchy of software components, each software component having a plurality of different versions comprising respective subgroups of different versions of the plurality of software artifacts, deriving architectural components of the software component hierarchy, comparing the differences between the composition of different versions of the software components with respect to the different versions of each of the subgroups of the software artifacts, classifying the derived architectural components according to the compared software component compositions, and outputting a visualization of the different software component compositions, which visualization is structured according to the classification of the architectural components.

In yet another aspect, the invention provides a computer program product being embodied on a computer-readable medium, the computer program product comprising instructions executable by a machine or a processor, the instructions implementing a method for analyzing changes in a software code, the method comprising inputting a plurality of different versions of a plurality of software artifacts to a change analysis device, deriving design constructs of the software code of the software artifacts by using an abstract syntax tree analysis, comparing the software code differences between the different versions of each of the software artifacts, classifying the derived design constructs of each of the software artifacts according to the compared software code differences, and outputting a visualization of the design constructs of each of the software artifacts, which visualization is structured according to the classification of the design constructs.

In yet another aspect, the invention provides a computer program product being embodied on a computer-readable medium, the computer program product comprising instructions executable by a machine or a processor, the instructions implementing a method analyzing changes in a software code, the method comprising inputting a plurality of software artifacts to a change analysis device, wherein the plurality of software artifacts are structured in a software component hierarchy of software components, each software component having a plurality of different versions comprising respective subgroups of different versions of the plurality of software artifacts, deriving architectural components of the software component hierarchy, comparing the differences between the composition of different versions of the software components with respect to the different versions of each of the subgroups of the software artifacts, classifying the derived architectural components according to the compared software component compositions, and outputting a visualization of the different software component compositions, which visualization is structured according to the classification of the architectural components.

BRIEF DESCRIPTION OF THE DRAWINGS

The accompanying drawings are included to provide a further understanding of the various embodiments and are incorporated in and constitute a part of this specification. The drawings illustrate the embodiments and together with the description serve to explain the various principles. Other embodiments and many of the intended advantages of the various embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
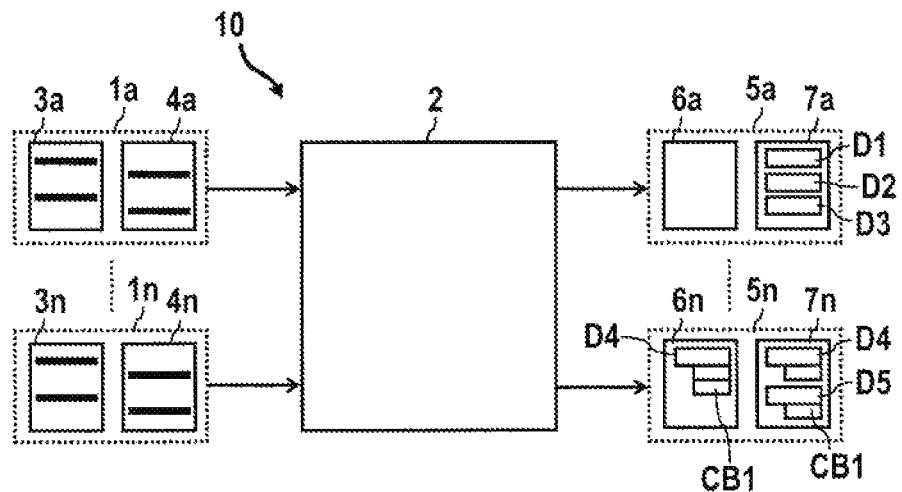
FIG. 1 schematically illustrates an embodiment of a software analysis system.

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Software code within the meaning of this application relates to any kind of computer-readable programming language, for example C, C++, C#, D, Java, JavaScript, .NET, Python, Pascal, SQL, Perl or any other similar programming language.

Software code artifacts within the meaning of this application relate to software fragments, that are separate software code objects produced as tangible by-products during the development of software code. Software code artifacts may be comprised of separate files containing software code which may be grouped up in different code blocks that make up the respective software artifact.

Software code design constructs within the meaning of this application relate to structural entities of the software code such as for example functions, data structures, classes, class methods, class members and other entities which depend on the programming language paradigm, for example object-oriented, procedural or functional. Software code artifacts may comprise one or more software code design constructs, which in turn may comprise one or more software code blocks.

Software code architecture within the meaning of this application relates to the hierarchy according to which a plurality of software code artifacts is arranged in a software system. The software code artifacts may for example be arranged in a hierarchical structure of file repositories with nested directories and subdirectories which are indicative of the underlying software code architecture. The software code architecture may comprise a plurality of architectural components, the hierarchy of which may correlate with the hierarchy of software code components of the software code, which in turn may include subgroups of different software code artifacts.

The present invention may apply to software systems, i.e. technical systems that rely on one or more software products, such as application programs, operation systems or similar software code products to function correctly.

Users that try to maintain and evolve a software system are interested in structured information about the status and the history of the software code underlying the software system. Information about the software code and its changes over time is usually scattered over several unstructured and by themselves uncorrelated documents like meeting reports, emails, phone conference protocols, personal expertise of single users or similar documents. In order to extract information about the software system from these sources, an automatic analysis tool is helpful in visualizing and presenting the available data in a structured manner. Ideally, different levels of abstraction and their correlation to neighboring levels should be visualized, depending on what type of information a respective user of the software system is trying to access.

For example, software architects are mainly interested in how the software architecture has evolved over a certain timeframe. Developers on the other hand may mainly be interested in the implementation work having been done by other developers during a certain time frame regarding the depending software code fragments. Other users, like project leaders, testers or technical writers may be interested in different aspects of the software code status on different levels of abstraction and the intercorrelation of these aspects across the levels of abstraction.

In order to provide structured information for different users of a software system, it is important to track the evolution of the software code over time, the sources of changes to the software code, the impacted regions within the software code for a single software modification, information on previous software changes or the relationship between changes on different levels of abstraction. The structured information should be able to resolve the tracking of the software changes with different and preferably selectable levels of granularity both with respect to time, abstraction, hierarchy and version history.

FIG. 1 schematically illustrates a software analysis system 10, which may be configured to automatically track changes to a software code and present those changes on different selectable levels of abstraction to a user. The software analysis system 10 comprises a change analysis tool 2, which takes as input a plurality of software artifacts 1a . . . , 1n. The software artifacts 1a . . . , 1n may each comprise a plurality of different versions 3a . . . , 3n and 4a . . . , 4n, respectively. The different versions may differ from each other by different lines of code which may have been changed from one version to another. Each of the different versions 3a . . . , 3n and 4a . . . , 4n of the software artifacts 1a . . . , 1n may comprise one or more code blocks of software code. The different versions 3a . . . , 3n and 4a . . . , 4n of the software artifacts 1a . . . , 1n may be taken from a certain configuration management repository or a certain directory of this repository. Furthermore, the versions 3a . . . , 3n and 4a . . . , 4n may span a certain predefined time frame over which changes to the software artifacts 1a . . . , 1n are to be tracked and analyzed.

The change analysis tool 2 is configured to derive structures of design constructs 5a . . . , 5n for each of the software artifacts 1a . . . , 1n by using an abstract syntax tree analysis. The changes to the code blocks of each of the software artifacts 1a . . . , 1n may be aligned to the respective design constructs 5a . . . , 5n. This process may be done for the different versions 3a . . . , 3n and 4a . . . , 4n of the software artifacts 1a . . . , 1n in order to get different versions 6a . . . , 6n and 7a . . . , 7n, respectively, of the structures of design constructs 5a . . . , 5n. For example, the version 6a of the design construct 5a may comprise three design constructs D1, D2, D3.

The design constructs may be classified according to the changes introduced to each of the design constructs. For example, the design construct D1 may be classified as "added" to the respective version 7a of the structure 5a of design constructs. Similarly, the design construct D2 may be classified as "removed" to the respective version 7a of the structure 5a of design constructs, and the design construct D3 may be classified as "changed" to the respective version 7a of the structure 5a of design constructs.

In addition, the change analysis tool 2 may related the changes of code blocks to changes of design constructs in a bidirectional way. Also, navigation between the list of design constructs and the list of related code block changes may be allowed, so that a changed design construct, for example the design construct D3 may be selected and the related code block changes returned as related structural information.

It may also be possible for the change analysis tool 2 to derive additional changes to the design constructs. For example, a design construct can be classified as having been "renamed" or "moved" to another software artifact.

Furthermore, the change type of code block changes within a changed design construct may be annotated with a classification. For example, the design construct D4 in version 6n of the structure 5n of design constructs may contain the code block CB1. After the change, the code block CB1 may have been moved from the design construct D4 to the design construct D5 within the version 7n of the structure 5n of design constructs. The design constructs D4 and D5 may therefore be classified accordingly in order to reflect the movement of the code block CB1 from one design construct to the other. Again, the code block CB1 may additionally be classified with the related design constructs D4 and D5.

Figure 2:
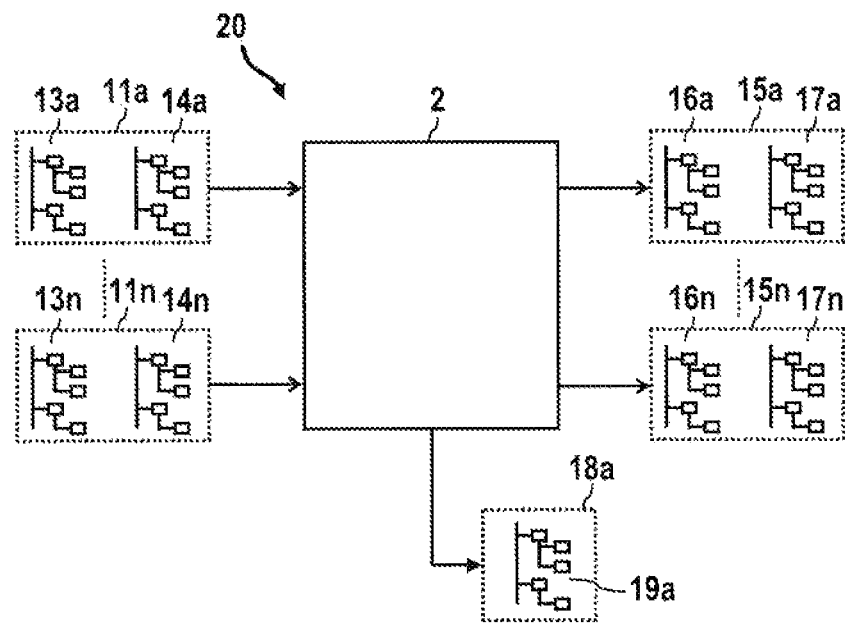
FIG. 2 schematically illustrates another embodiment of a software analysis system.

FIG. 2 schematically illustrates a software analysis system 20, which may be configured to automatically track changes to a software code and present those changes on different selectable levels of abstraction to a user. The software analysis system 20 comprises a change analysis tool 2, which takes as input a plurality of software artifacts 11a . . . , 11n. The software artifacts 11a . . . , 11n may be arranged in a hierarchical structure of software components. There may be different versions 13a . . . , 13n and 14a . . . , 14n, respectively, of the software artifacts 11a . . . , 11n. The software component hierarchies may be taken from a repository directory hierarchy structure. Any directory or software artifact within the hierarchy may be seen as architectural component. The hierarchy of architectural components may be derived from the hierarchical alignment of software artifacts within the respective systems of software components.

The change analysis tool 2 may be configured to classify each architectural component 15a . . . , 15n according to a change type. For example, the change types may comprise "added", "removed" or "moved" in case the respective hierarchy element has been added, removed or moved to another location within the directory hierarchy. The respective versions 16a . . . , 16n and 17a . . . , 17n of the architectural components 15a . . . , 15n may be tagged accordingly. An architectural component may be tagged or classified as "changed" if the content of its respective subdirectories has changed, for example by adding, removing or moving a software artifact from one component to another.

Previous classifications of design constructs, such as derived and classified design constructs 5a . . . , 5n as processed by the change analysis tool 2 of FIG. 1 may be taken into account when classifying the respective architectural components. In order to do so, a dependency analysis may be performed. For example, proprietary tools or commercially available tools like SonarJ, SonarGraph, Klockwork Insight, Lattix or similar tools may be used.

The dependency analysis provide a connection between the design constructs, the respective software code artifacts making up the design constructs and the hierarchy of architectural components. For example, interfaces between design constructs of different software components can be classified as separate structure element within the hierarchy of architectural components. In that way, changes in functional requirements, interdependent interfaces or provided interfaces to other design constructs may be resolved on a version-sensitive basis in the different versions of the hierarchies 16a . . . , 16n and 17a . . . , 17n of architectural components.

The change analysis tool 2 may derive the connections between the required interfaces and the provided interfaces and classifies those in the respective hierarchy tree accordingly. Design constructs that do currently not have any interdependencies to other design constructs may be classified as component implementations within the hierarchy of an architectural component.

Each set of design constructs may be attributed a specific change type from one version to another within the component hierarchy. For example, if a design construct from the set of required interfaces has been added, removed or changed, the set of required interfaces may set to the type status "changed" as well. In turn, each design construct being part of one of these sets may be associated with the respective change type that has been determined in the change analysis. Therefore, the change analysis relates changes on the architectural level as well as on the design level and provides bidirectional intercorrelations between the different levels.

Both of the systems 10 and 20 detailed in FIGS. 1 and 2 may be configured to output the respective classifications and versions in a visualization or respectively structured data pattern, in order for a user to quickly get an overview over the analyzed software system, both in terms of temporal resolution as well as selected level of abstraction. Although in FIGS. 1 and 2 only two versions, two software artifacts and two component hierarchies have been shown exemplarily, it should be apparent that the number of those elements is not limited. Also, the change analysis may be performed concerning several points of time within a predefined time frame. The differing states and changes on different levels of abstraction may be investigated at the start and end point of such a time period only. Alternatively, incremental code changes at each point in time may be analyzed.

The output of the change analysis tool 2 may be made available to different groups of project members automatically, for example by email or other monitoring tools. Depending on the status of the respective project member, different changes may be made available automatically. For example, project stakeholders may be interested in architectural changes only, therefore, only information regarding architecturally relevant changes may be distributed by the change analysis tool 2 to those stakeholders. On the other hand, developer groups may be interested in design construct changes, so information concerning design construct changes may be made available automatically to those developer groups.

The change analysis tool 2 may automatically designate "hot spots" of changes, that is, components or parts of the software system that are subject too frequent changes from version to version. The information on "hot spots" may be automatically delivered in order to identify architectural components or design constructs that need further investigation, refactoring or redesign.

Figure 3:
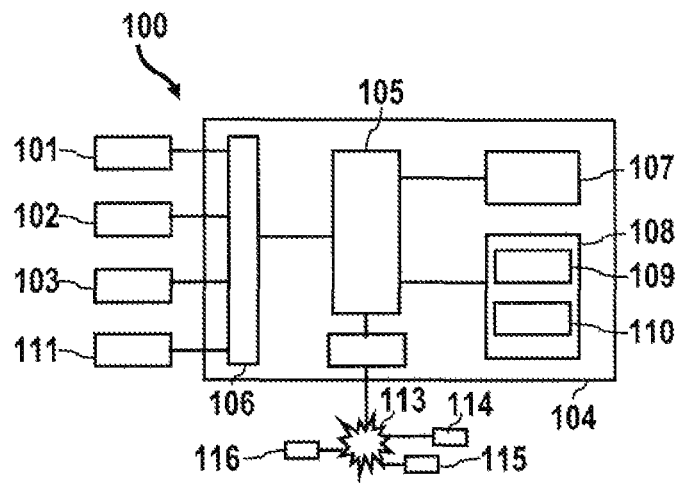
FIG. 3 schematically illustrates an embodiment of a processing environment for a software analysis system.

FIG. 3 schematically illustrates an embodiment of a processing environment 100 for a software change analysis system, for example the software change analysis system 10 or 20 as depicted and detailed with respect to FIG. 1 or 2. The environment 100 may be programmable for determining an extent of code changes upon fixing a software bug in a bugged software code or upon implementation of a software modification. The environment 100 may include a plurality of input/output devices, for example a mouse 101, a keyboard 102 or a display device 103 such as a monitor, or other not depicted input devices like a microphone, a joystick, a game pad, a scanner, or the like.

The environment 100 may further include a computer 104, for example a personal computer, a workstation, a server or a similar device, having a central processor unit (CPU) 105, an input/output processing unit 106, a memory 107 and a data storage device 108. The data storage device 108 may be configured to store instructions executable by a computer or machine, data, machine-readable code and/or a plurality of programs such as an operating system 109 and a plurality of application programs 110 for implementing a method for analyzing changes to a software code.

Figure 4:
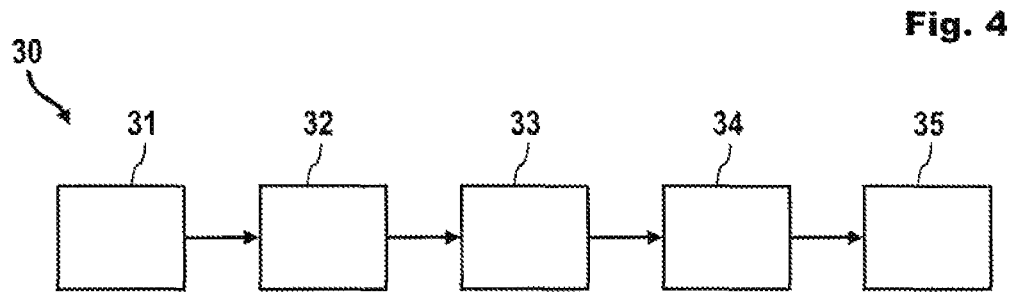
FIG. 4 schematically illustrates an embodiment of a method for analyzing changes in a software code.
Figure 5:
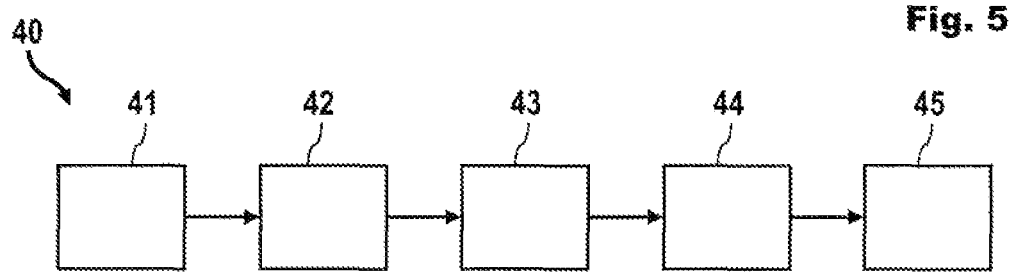
FIG. 5 schematically illustrates another embodiment of a method for analyzing changes in a software code.

In particular, the application programs 110 may be configured to implement one or more of the methods 30 and 40 as depicted and detailed with respect to FIGS. 4 and 5. The application programs may be processed by the CPU 105. There may be only one or there may be more than one CPUs 105, such that the processor of the computer 104 comprises a single central processing unit, or a plurality of processing units, commonly referred to as a multiprocessor or parallel-processor environment. In various embodiments, which may comprise some but not all of the foregoing embodiments, the computer 104 may be a conventional computer, a distributed computer, or any other type of computer. The computer 104 may be a handheld device, a workstation, a server, a smartphone, a laptop or some combination of these capable of responding to and executing instructions in a defined manner.

The operating system 109 may for example be a Windows operating system, a Unix operating system, a Linux operating system, a Macintosh operating system, a Chrome operating system or similar operating systems. The data storage device 108 may be any form of non-volatile memory, including by way of example semiconductor memory devices, such as Erasable Programmable Read-Only Memory (EPROM), Electrically Erasable Programmable Read-Only Memory (EEPROM), and flash memory devices, magnetic disks such as internal hard disks and removable disks, magneto-optical disks, Digital Versatile Disc Memory (DVD) and Compact Disc Read-Only Memory (CD-ROM).

It may also be possible that the application programs 110 are stored on an external storage device 111 which may be connected to the computer 104 via the input/output processing unit 106.

The environment 100 may further comprise a communications device 112, for example a modem or a network adapter for exchanging data with a network 113. The network 113 may for example be the Internet, a local area network (LAN), a wide area network (WAN), analog or digital wired or wireless telephone networks, radio, television, cable, or satellite networks. The system 100 may communicate with a plurality of other network nodes 114, 115, 116 over the network 113.

A user may enter commands and information into computer 104 through the plurality of input/output devices 101, 102, 103, which commands and information may be processed by the input/output processing unit 106 and relayed to the CPU 105 for further processing. The CPU 105 may in turn relay processed data via the input/output processing unit 106 one or more of the input/output devices, for example the display 103 for displaying the processed data to the user.

FIG. 4 schematically illustrates a method 30 for analyzing changes in a software code. In a first step 31, the method 30 comprises inputting a plurality of different versions of a plurality of software artifacts to a change analysis device, for example a change analysis tool 2 as depicted and detailed with respect to FIG. 1. In a second step 32, the method 30 may comprise deriving design constructs of the software code of the software artifacts by using an abstract syntax tree analysis. In a third step 33, the method 30 may comprise comparing the software code differences between the different versions of each of the software artifacts. In a fourth step 34, the method 30 may comprise classifying the derived design constructs of each of the software artifacts according to the compared software code differences. Finally, in a fifth step 35, the method 30 may comprise outputting a visualization of the design constructs of each of the software artifacts, which visualization is structured according to the classification of the design constructs.

FIG. 5 schematically illustrates a method 40 for analyzing changes in a software code. In a first step 41, the method 40 comprises inputting a plurality of software artifacts to a change analysis device, wherein the plurality of software artifacts are structured in a software component hierarchy of software components, each software component having a plurality of different versions comprising respective subgroups of different versions of the plurality of software artifacts. The change analysis device may for example be a change analysis tool 2 as depicted and detailed with respect to FIG. 2.

In a second step 42, the method 40 may comprise deriving architectural components of the software component hierarchy. In a third step 43, the method 40 may comprise comparing the differences between the compositions of different versions of the software components with respect to the different versions of each of the subgroups of the software artifacts. In a fourth step 44, the method 40 may comprise classifying the derived architectural components according to the compared software component compositions. In a fifth step 45, the method 40 may comprise outputting a visualization of the different software component compositions, which visualization is structured according to the classification of the architectural components.

Figure 6:
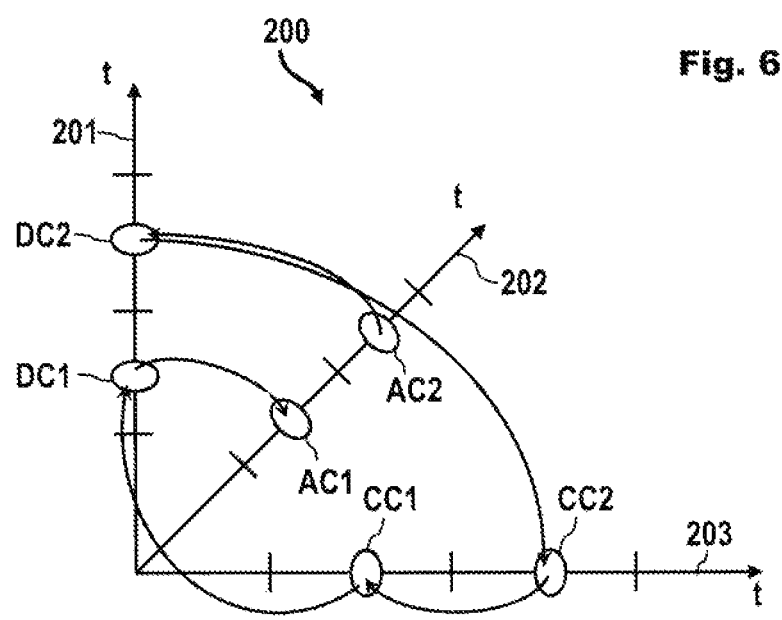
FIG. 6 schematically illustrates a change tracking diagram for a software code with respect to different levels of abstraction according to an embodiment.

FIG. 6 schematically illustrates a change tracking diagram for a software code with respect to different levels of abstraction according to an embodiment. Each of the different axes in the generally n-dimensional change tracking diagram, of which only three are exemplarily shown in FIG. 6 are correlated to different levels of abstraction. For example, the axis 201 shows the temporal evolution of design constructs of the software code. Between a first state and a second state of the software code, the changes applied to the software code with respect to the design constructs may be summarized in an information unit DC1. Similarly, the changes applied to the software code between the second state and a third state of the software code with respect to the design constructs may be summarized in an information unit DC2.

On a higher level of abstraction, the information units AC1 and AC2 may group up the information about the changes to the software code architecture on an axis 202 over time. On the other hand, on a lower level of abstraction, the information units CC1 and CC2 may group up the information about the changes to the software code artifacts itself on an axis 203 over time. Generally speaking, the information in the information units CC1 and CC2 will comprise more data than the information in the information units AC1 and AC2. For example, changes in the software code which will only affect the content of code blocks within a single software code artifact may not affect the association of the software code artifact to a software component. Therefore, in this example, the information unit CC relating to the software changes on a code block level will comprise information about the actual code change, while the information unit AC relating to the architectural changes will indicate that the software architecture has not changes with the changes in the software code.

The possibilities with obtaining structured information via a software change analysis as described above may help in different usage scenarios. For example, in case of an error in the software, the faulty software component and the location of the respective software artifacts within the component hierarchy may allow for identifying the specific software code change that caused the erroneous behavior of the system. The software change analysis device may then present all other changes introduced simultaneously to the change that introduced the software code error. A developer would be able to comprehend the software code much faster by navigating between the different levels of abstraction.

For example, by starting on the architecture level with the architecture changes AC2, the developer may view the associated design changes DC2 and subsequently the actual code changes CC2 associated with the changes AC2 and/or DC2. By backtracking the actual code changes on the lowest structure level to the code changes CC1, the developer may be able to find information about the specific requirements these changes have been made for and the respective project members responsible for these changes. He may then go back up to higher levels of abstraction again and, for example, arrive at the structural changes AC1 to the software architecture at an earlier development/modification stage.

With the software change analysis methods and systems described herein, it may be possible to filter changes to a software system over a certain period of time on all system abstraction levels according to a combination of predefined or selectable criteria. These criteria might for example include the project member having made the changes, the contents of a logging protocol of configuration management check-ins, components and design constructs containing certain annotations or components and design constructs complying with certain naming conventions.

In the foregoing detailed description, various features are grouped together in one or more examples or examples for the purpose of streamlining the disclosure. This method of disclosure is not to be interpreted as reflecting an intention that the claimed examples require more features than are expressly recited in each claim. Rather, as the following claims reflect, the various subject matter lie in less than all features of a single disclosed example. Thus the following claims are hereby incorporated into the detailed description as examples, with each claim standing on its own as a separate example. It is understood that the above description is intended to be illustrative, and not restrictive. It is intended to cover all alternatives, modifications and equivalents as may be included within the scope of the invention as defined in the appended claims. Many other examples will be apparent to one skilled in the art upon reviewing the above specification. The scope of the invention should, therefore, be determined with reference to the appended claims, along with the full scope of equivalents to which such claims are entitled. Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments are presented for purposes of illustration and description. They are not intended to be exhaustive or to limit the invention to the precise forms disclosed, obviously many modifications and variations are possible in view of the above teachings. The embodiments were chosen and described in order to best explain the various principles and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS

1*a* Software Artifact
1*n* Software Artifact
2 Change Analysis Tool
3*a* Software Artifact Version
3*n* Software Artifact Version
4*a* Software Artifact Version
4*n* Software Artifact Version 5a Software Artifact
5n Software Artifact
6a Design Construct Structure
6n Design Construct Structure
7a Design Construct Structure
7n Design Construct Structure
10 Change Analysis Device
11a Component Hierarchy
11n Component Hierarchy
13a Component Hierarchy Version
13n Component Hierarchy Version
14a Component Hierarchy Version
14n Component Hierarchy Version
15a Component Hierarchy
15n Component Hierarchy
16a Component Hierarchy Version
16n Component Hierarchy Version
17a Component Hierarchy Version
17n Component Hierarchy Version
18a Component Hierarchy
19a Component Hierarchy Structure
20 Change Analysis Device
30 Method
31 Method Step
32 Method Step
33 Method Step
34 Method Step
35 Method Step
40 Method
41 Method Step
42 Method Step
43 Method Step
44 Method Step
45 Method Step
100 System
101 Mouse
102 Keyboard
103 Display
104 Computer
105 Central Processing Unit
106 Input/output Processing Unit
107 Memory
108 Data Storage Device
109 Operation System
110 Application Programs
111 External Storage Device
112 Communications Device
113 Network
114 Network Node
115 Network Node
116 Network Node
D1 Design Construct
D2 Design Construct
D3 Design Construct
D4 Design Construct
D5 Design Construct
CB1 Code Block

What is claimed is:

1. A method for analyzing changes in a software code, the method comprising:
inputting a plurality of different versions of a plurality of software artifacts to a change analysis device, along with a corresponding software code architecture;
wherein the plurality of software artifacts are structured in a software component hierarchy of software components, each software component having a plurality of different versions comprising respective subgroups of different versions of the plurality of software artifacts;
deriving design constructs of the software code of the software artifacts by using an abstract syntax tree analysis;
comparing the software code differences between the different versions of each of the software artifacts;
classifying the derived design constructs of each of the software artifacts according to the compared software code differences, the software component hierarchy of the software components, and the corresponding software code architecture; and
outputting a visualization of the design constructs of each of the software artifacts, which visualization is structured according to the classification of the design constructs.

2. The method according to claim 1, wherein classifying the derived design constructs comprises marking the design constructs as added, removed or changed from one version to another.

3. The method according to claim 1, further comprising:
comparing the software code differences between different versions of different software artifacts.

4. The method according to claim 3, wherein classifying the derived design constructs comprises marking the design constructs as moved or renamed from one version of a first software artifact to a version of a second software artifact.

5. The method according to claim 3, wherein comparing the software code differences between different versions of different software artifacts comprises applying a code duplicate or similarity finding technique.

6. A method for analyzing changes in a software code, the method comprising:
inputting a plurality of software artifacts to a change analysis device, wherein the plurality of software artifacts are structured in a software component hierarchy of software components, each software component having a plurality of different versions comprising respective subgroups of different versions of the plurality of software artifacts;
deriving architectural components of the software component hierarchy;
comparing the differences between the compositions of different versions of the software components with respect to the different versions of each of the subgroups of the software artifacts;
classifying the derived architectural components according to the compared software component compositions and the software component hierarchy of the software components; and
outputting a visualization of the different software component compositions, which visualization is structured according to the classification of the architectural components.

7. The method according to claim 6, wherein classifying the derived architectural components comprises marking the software components as added, removed or changed from one version of the software component composition to another.

8. The method according to claim 6, further comprising:
deriving design constructs of the software code of the software artifacts by using an abstract syntax tree analysis;
comparing the software code differences between the versions of the respective software artifacts making up each of the derived design constructs;
performing a dependency analysis to classify the derived architectural components according to the interdependencies between different versions of derived design constructs; and outputting a visualization of the different architectural components, which visualization is structured according to the interdependencies between different versions of derived design constructs.

9. The method according to claim 8, wherein performing the dependency analysis comprises using an architectural analysis tool.

10. A software analysis system, comprising:
a system memory in communication with a change analysis engine;
the change analysis engine configured to analyze changes in a software code by:
reading a plurality of different versions of a plurality of software artifacts into a system memory, along with a corresponding software code architecture;
wherein the plurality of software artifacts are structured in a software component hierarchy of software components, each software component having a plurality of different versions comprising respective subgroups of different versions of the plurality of software artifacts;
deriving design constructs of the software code of the software artifacts by using an abstract syntax tree analysis;
comparing the software code differences between the different versions of each of the software artifacts;
classifying the derived design constructs of each of the software artifacts according to the compared software code differences, the software component hierarchy of the software components, and the corresponding software code architecture; and
a display outputting a visualization of the design constructs of each of the software artifacts, which visualization is structured according to the classification of the design constructs.

11. The software analysis system according to claim 10, wherein classifying the derived design constructs comprises marking the design constructs as added, removed or changed from one version to another.

12. The software analysis system according to claim 10, further comprising:
comparing the software code differences between different versions of different software artifacts.

13. The software analysis system according to claim 12, wherein classifying the derived design constructs comprises marking the design constructs as moved or renamed from one version of a first software artifact to a version of a second software artifact.

14. The software analysis system according to claim 12, wherein comparing the software code differences between different versions of different software artifacts comprises applying a code duplicate or similarity finding technique.

15. A software analysis system, comprising:
a system memory in communication with a change analysis engine;
the change analysis engine configured to analyze changes in a software code by:
reading a plurality of software artifacts into the system memory, wherein the plurality of software artifacts are structured in a software component hierarchy of software components, each software component having a plurality of different versions comprising respective subgroups of different versions of the plurality of software artifacts;
deriving architectural components of the software component hierarchy;
comparing the differences between the composition of different versions of the software components with respect to the different versions of each of the subgroups of the software artifacts;
classifying the derived architectural components according to the compared software component compositions, and the software component hierarchy of the software components, and the software component hierarchy of the software components; and
a display outputting a visualization of the different software component compositions, which visualization is structured according to the classification of the architectural components.

16. The software analysis system according to claim 15, wherein classifying the derived architectural components comprises marking the software components as added, removed or changed from one version of the software component composition to another.

17. The software analysis system according to claim 15, further comprising:
deriving design constructs of the software code of the software artifacts by using an abstract syntax tree analysis;
comparing the software code differences between the versions of the respective software artifacts making up each of the derived design constructs;
performing a dependency analysis to classify the derived architectural components according to the interdependencies between different versions of derived design constructs; and
outputting a visualization of the different architectural components, which visualization is structured according to the interdependencies between different versions of derived design constructs.

18. The software analysis system according to claim 17, wherein performing the dependency analysis comprises using an architectural analysis tool.

19. A computer program product being embodied on a computer-readable non-transitory medium, the computer program product comprising instructions executable by a machine or a processor, the instructions implementing a method for analyzing changes in a software code, the method comprising:
inputting a plurality of different versions of a plurality of software artifacts to a change analysis device, along with a corresponding software code architecture;
wherein the plurality of software artifacts are structured in a software component hierarchy of software components, each software component having a plurality of different versions comprising respective subgroups of different versions of the plurality of software artifacts;
deriving design constructs of the software code of the software artifacts by using an abstract syntax tree analysis;
comparing the software code differences between the different versions of each of the software artifacts;
classifying the derived design constructs of each of the software artifacts according to the compared software code differences, the software component hierarchy of the software components, and the corresponding software code architecture; and
outputting a visualization of the design constructs of each of the software artifacts, which visualization is structured according to the classification of the design constructs.

20. A computer program product being embodied on a non-transitory computer-readable medium, the computer program product comprising instructions executable by a machine or a processor, the instructions implementing a method analyzing changes in a software code, the method comprising:

inputting a plurality of software artifacts to a change analysis device, wherein the plurality of software artifacts are structured in a software component hierarchy of software components, each software component having a plurality of different versions comprising respective subgroups of different versions of the plurality of software artifacts;

deriving architectural components of the software component hierarchy;

comparing the differences between the composition of different versions of the software components with respect to the different versions of each of the subgroups of the software artifacts;

classifying the derived architectural components according to the compared software component compositions and the software component hierarchy of the software components; and outputting a visualization of the different software component compositions, which visualization is structured according to the classification of the architectural components.

\* \* \* \* \*